J. T. JETER.
Seed-Sower and Fertilizer-Distributer.
No. 218,124.  Patented Aug. 5, 1879.
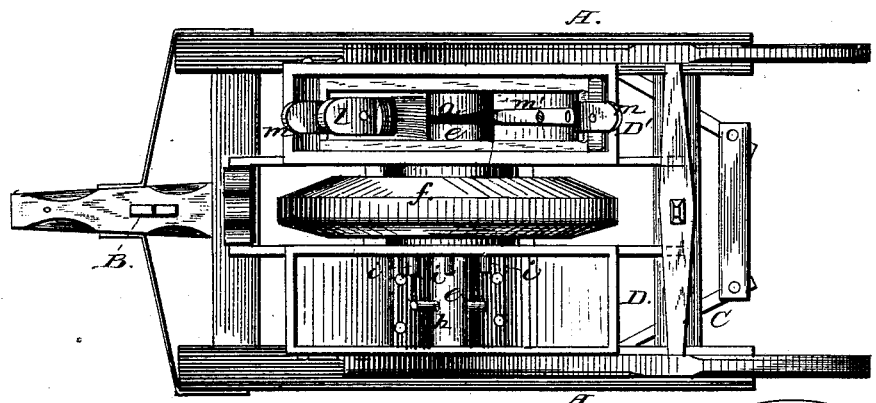
Fig. 1.
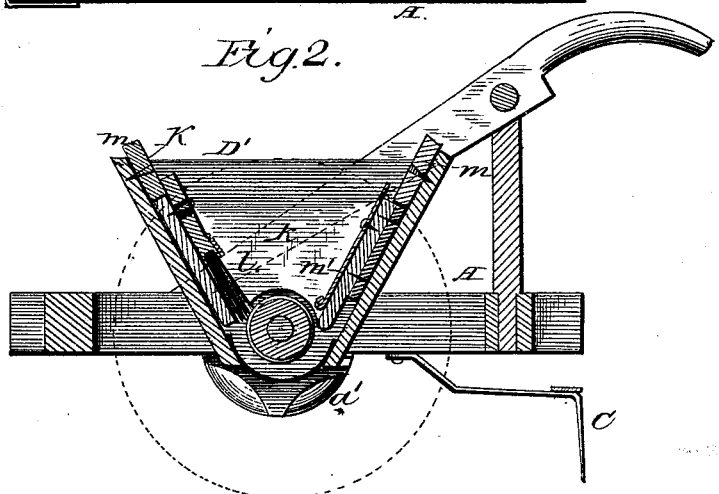
Fig. 2.
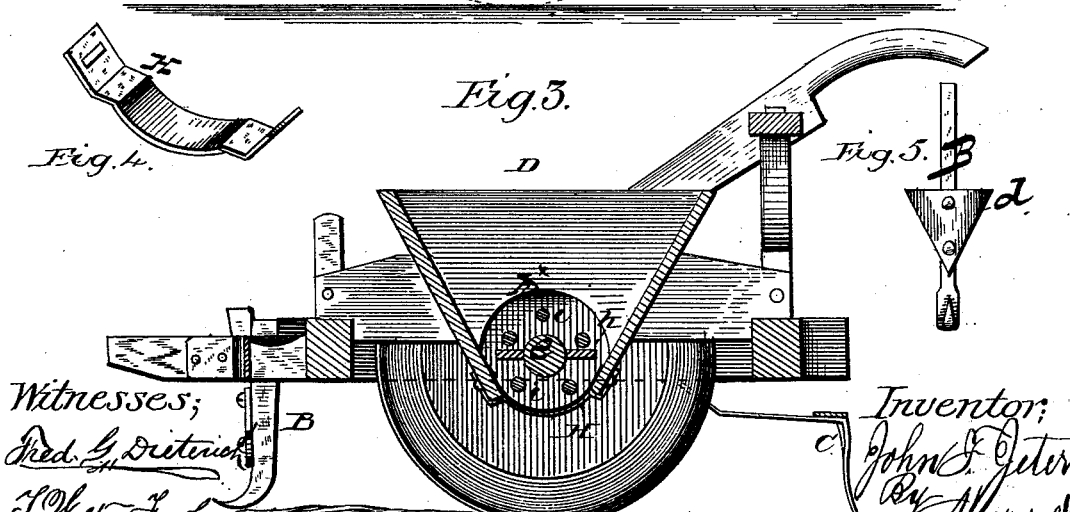
Fig. 3.
Fig. 4.
Fig. 5.
Witnesses:  Inventor:

UNITED STATES PATENT OFFICE.

JOHN T. JETER, OF GERMANIA, ALABAMA.

IMPROVEMENT IN SEED-SOWER AND FERTILIZER-DISTRIBUTER.

Specification forming part of Letters Patent No. 218,124, dated August 5, 1879; application filed May 15, 1879.

*To all whom it may concern:*

Be it known that I, JOHN T. JETER, of Germania, in the county of Calhoun and State of Alabama, have invented certain new and useful Improvements in Seed-Sowers and Fertilizers; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a plan view of my combined planter and fertilizer-distributer. Figs. 2 and 3 are vertical sections thereof, one taken through the planter and the other through the distributer; and Figs. 4 and 5 are detail views of the same.

This invention has relation to improvements in a combined corn-planter and fertilizer-distributer; and it consists in certain details of construction and arrangement of the parts, substantially as hereinafter more fully set forth and claimed.

In the accompanying drawings, A marks a frame, with its forward end provided with a colter-beam, having the colter B; and its rear end provided with handles for guiding the machine. Hung to the lower side of the same end of the frame A are scrapers C, also adapted to cover the furrows which receive the corn.

$f$ is the transporting and driving wheel, disposed centrally in the frame A and secured to a shaft, $e$, passing through two hoppers, D D', one disposed on each side of the wheel, as seen in Fig. 1. This shaft has a different diameter in each of the hoppers, its enlarged diameter in the corn-hopper D' having an annular groove, $a$, for feeding the corn in quantities to the dropping-spout $a'$, affixed to the under side of said hopper. Its reduced portion in the fertilizer-hopper D is provided with a transverse agitating-pin, $h$, which, in connection with pins $i$ $i$ on the inside of the said hopper, loosen and cause the dropping of the fertilizer through the opening in the bottom of said hopper.

In the hopper D' is arranged a removable hopper, $k$, buttoned in place therein by the buttons $m$, pivoted to the said hopper at its upper edge.

The hopper $k$ has a plate, $m'$, on one side, reaching down to the groove $a$ in the shaft $e$, to prevent the escaping of the grain through said groove backwardly; and on its other side it has a brush, $l$, to regulate the feeding of the grain to the discharging-groove $a$, from which the grain is discharged into the spout $a'$, which drops it into the ground just in rear of the wheel $f$.

The spout $a'$ inclines downwardly toward the wheel $f$, with its discharging end opening near the wheel $f$.

The bottom of each of the hoppers D D' is provided, next to the wheel $f$, with an opening, covered by a valve or slide, H, Fig. 4, by the lateral adjustment of which the openings in the bottoms of the hoppers may be varied in size to accordingly affect the dropping of the grain and the distributing of the fertilizer, both of which operations being performed simultaneously, if desired.

The colter B is provided with a triangular shovel, $d$, to clear away obstacles, &c.

I am aware that, broadly, two hoppers arranged in connection with a separate shaft and separate operating mechanism for dropping the grain and distributing the fertilizer from that for transporting or propelling the machine are old.

What I claim as new, and desire to secure by Letters Patent, is—

In a combined corn-dropper and fertilizer-distributer, the combination, with the hoppers D D', mounted on a frame, A, and supplied one with a brush, $l$, and check-plate $m'$, and the other with inwardly-projecting lateral pins $i$, of the transporting and driving wheel $f$, arranged between the two hoppers D D', with its shaft $e$ passing through said hoppers, and provided with an agitator, $h$, in one hopper and an annular groove, $a$, in the other hopper, whereby the operation of both the corn-dropping and the fertilizer-distributing mechanisms are effected by the said transporting-wheel, substantially as shown and described.

In testimony that I claim the foregoing as my own I affix my signature in presence of two witnesses.

JOHN T. JETER.

Witnesses:
J. L. SWAN,
L. W. CANNON.